United States Patent [19]

Miller

[11] 4,332,637
[45] Jun. 1, 1982

[54] ROPE CUTTING AND SEALING MACHINE

[76] Inventor: Alvin L. Miller, 14949 Stanwood St., SW., Dalton, Ohio 44618

[21] Appl. No.: 171,464

[22] Filed: Jul. 23, 1980

[51] Int. Cl.³ .......................................... B32B 31/00
[52] U.S. Cl. ........................................ 156/353; 83/16; 156/82; 156/88; 156/359; 156/366; 156/497; 156/250; 156/510
[58] Field of Search .................. 156/88, 82, 499, 453, 156/251, 515, 353, 359, 366, 497; 83/15, 16

[56] References Cited

U.S. PATENT DOCUMENTS

| | | | |
|---|---|---|---|
| 2,551,811 | 5/1951 | Mueller | 156/515 |
| 2,732,881 | 1/1956 | Anderle | 156/88 |
| 3,322,584 | 5/1967 | Welin-Beuger | 156/88 X |
| 3,856,599 | 12/1974 | Bylund | 156/88 |
| 4,070,222 | 1/1978 | Olson | 156/251 |

*Primary Examiner*—David A. Simmons
*Attorney, Agent, or Firm*—Harvey B. Jacobson

[57] ABSTRACT

A predetermined length of rope is fed between drive and idler pulleys, through guides and into a heat die block. Heat is applied to the rope for a predetermined period after which the rope is cut by a solenoid actuated knife. The rope feeding and heating processes are controlled by counter actuated and time delay relay actuated switches, respectively. After the knife has cut the rope, it actuates a switch which resets the counter and the time delay relays at which time the next length of rope is fed through the machine, automatically.

19 Claims, 5 Drawing Figures

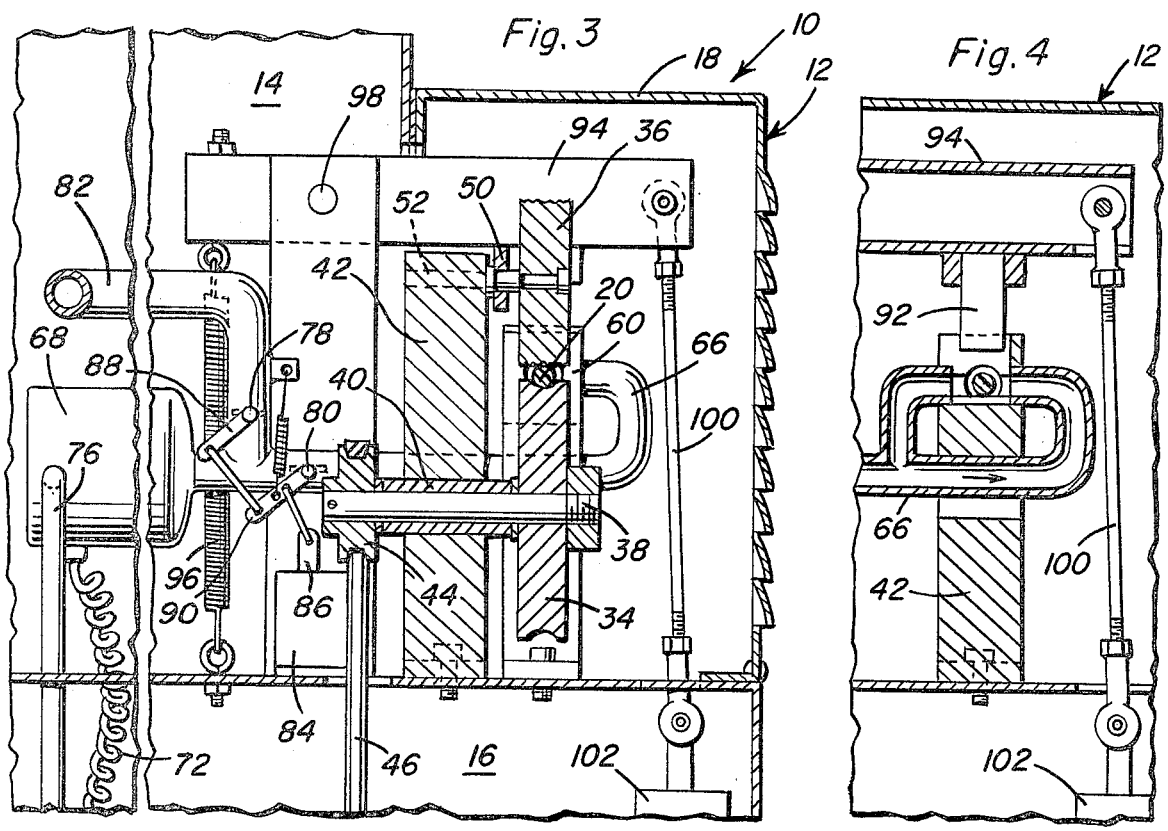
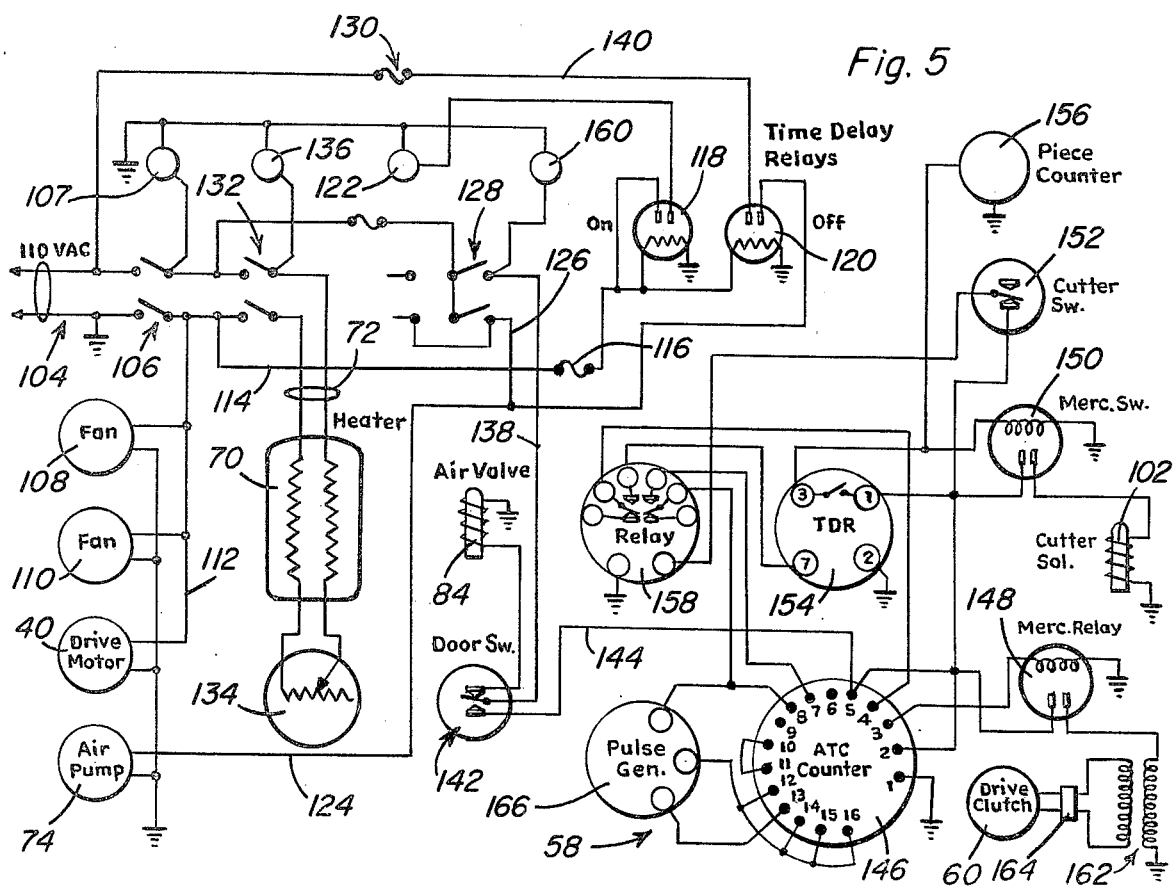

ROPE CUTTING AND SEALING MACHINE

BACKGROUND OF THE INVENTION

1. Field of the Invention

This invention relates to improvements in combined cutters and sealers of the type particularly adapted for cutting and simultaneously sealing the cut edge of rope material wholly or partly formed from fusible fibers such as nylon.

2. Discussion of the Related Art

The sale and distribution of ropes or other elongated materials is normally carried on by wrapping a predetermined very long length of rope or material on a spool with the purpose being that at the final sale, the section of rope or material being purchased will be cut from the initial length. When various sections are cut from the material, it is necessary to bind or seal the cut free edge in order to prevent the edge from unravelling when used. The ends of ropes produced from nylon or other fusible materials can be bonded together by heating the individual ends of the rope until the rope fibers melt and fuse together.

Various machines have been suggested for cutting and or fusing the ends of materials such as rope, sheet material, webs or the like. However, none of the existing devices is adequate for producing a smooth, consistent, automatic cutting and fusing operation wherein the ends of the material are adequately fused to insure a long, usable life. For instance, U.S. Pat. No. 2,551,811, issued May 8, 1951 to Mueller shows a cutting and sealing apparatus for operating on fusible fiber material. The Mueller device includes an anvil over which the material to be cut is passed. The anvil is heated to fuse the fabric and acts as one of the cutting elements of the device. A reciprocating rotary knife is moved automatically across the anvil to sever the fabric. U.S. Pat. No. 3,332,584, issued May 30, 1967 to Welin-Berger, shows a method of bonding a plurality of layers of fabric in which a plurality of fabric sheets are laid upon each other. A hot gas is passed over the layered sheets with the heat of the gas passing through each sheet and bonding them together. U.S. Pat. No. 2,732,881, issued Jan. 31, 1956 to Anderle, shows a cord cutter which includes a generally straight resistance wire disposed between a pair of spaced parallel guide members. The cord to be cut is moved between the guide members and brought into contact with the wire. The heat from the wire both cuts the cord and melts the ends thereof.

SUMMARY OF THE INVENTION

One object of the present invention is to provide a rope cutting and sealing machine which will automatically measure off predetermined lengths of rope, cut the length of rope from a supply rope and seal the cut ends to prevent unravelling thereof.

A further object of the present invention is to provide a rope cutting and sealing machine wherein the sealing operation is proformed by application of heated air to an elongated area of the rope to be sealed.

An even still further object of the present invention is to provide a rope cutting and sealing machine wherein the cutting operation is performed by a vertically movable knife which severs the rope after it has been heated.

In accordance with the above objects, the cutting and sealing machine of the present invention includes a housing containing a rope feeding apparatus comprising a driven pulley and a spring biased idler pulley between which the rope to be cut is passed. The rope is then threaded through an opening in a die block and out the other side of the housing. A rope length counter can be set and operation of the device initiated whereupon the driven pulley feeds the set length of rope through the die block. When the desired length of rope has been measured out, the rope is held in place while heated air is forced through an external opening in the die block to heat and fuse the rope on one inch on either side of the desired cutting point. When the fusing has been acomplished, an arm containing a knife blade is moved downwardly. The knife slides through an opening in the die block and severs the rope. Upon upward movement of the knife, a microswitch is actuated which resets the controls of the invention for initiating operation of the next successive cycle.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a side elevational sectional view taken substantially along a plane passing through section line 3—3 of FIG. 1.

FIG. 4 is a side elevational sectional view taken substantially along a plane passing through section line 4—4 of FIG. 1.

FIG. 5 is a schematic diagram of the control system of the invention.

DESCRIPTION OF THE PREFERRED EMBODIMENT

Figure 1:
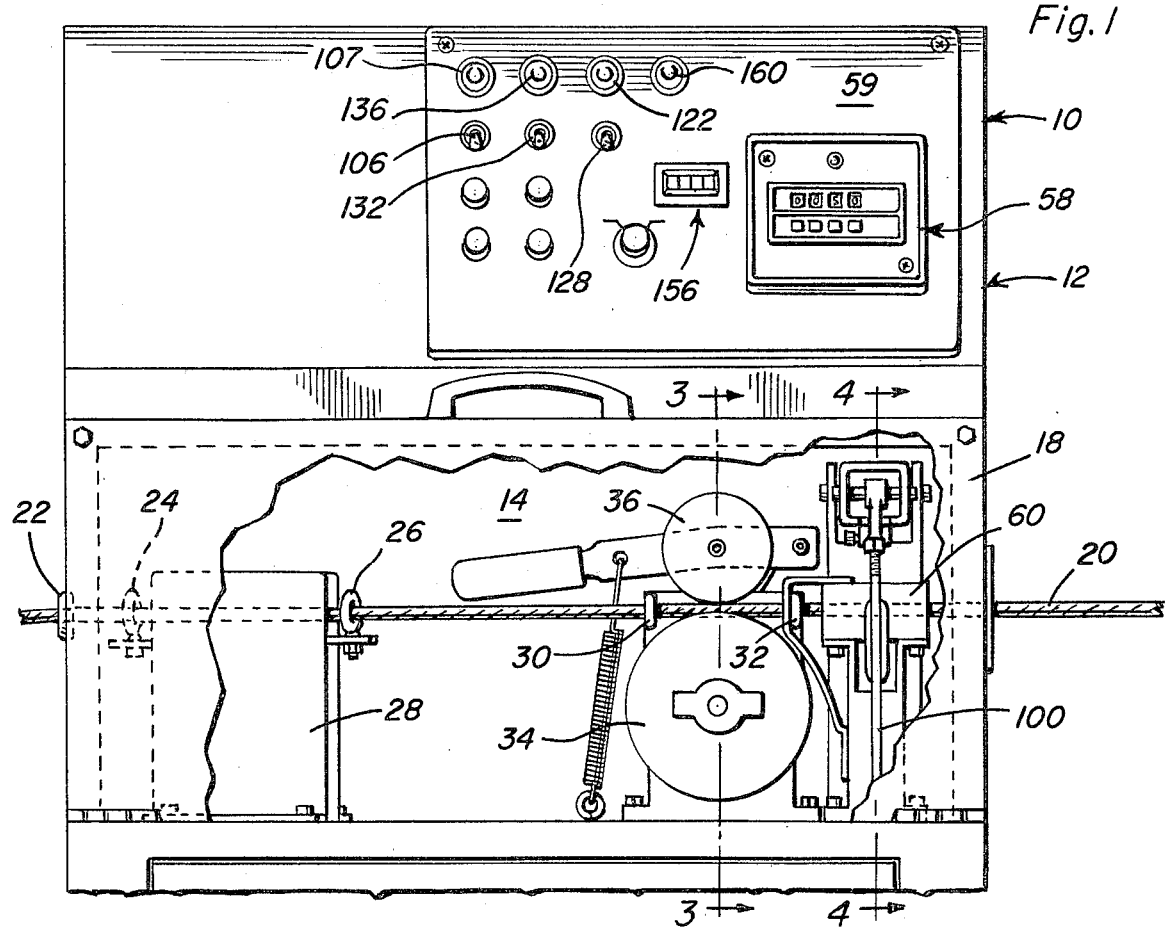
FIG. 1 is a front elevational view showing the upper portion of the housing of the invention with the front cover panel broken away to show the fusing and cutting apparatus.
Figure 2:
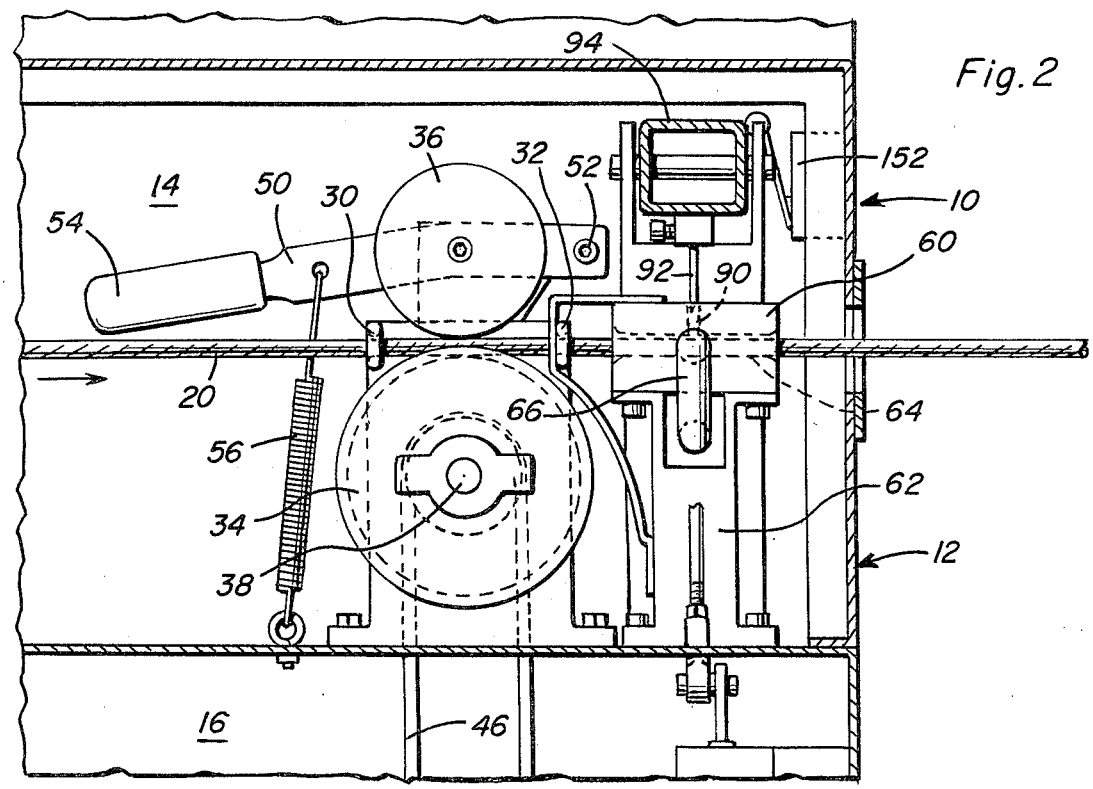
FIG. 2 is a front elevational sectional view showing the rope feeding mechanism and die block in greater detail.

Now with reference to the drawings, a rope sealing and cutting machine incorporating the principles and concepts of the present invention and generally referred to by the reference numeral 10 will be described in detail. Machine 10 includes a housing 12 having an upper compartment 14 and a lower compartment 16. Upper compartment 14 contains an access door 18 which is hingedly connected to the housing and can be swung outwardly and downwardly to allow entry into the upper compartment for threading rope 20 through the operating components contained therein.

Rope 20 is threaded through eyelet 22 contained in one side wall of housing 12. The rope extends through guides 24 and 26 which are attached to a common mounting structure 28 contained in the left-hand side of compartment 14 as viewed in FIG. 1. Additional guides 30 and 32 hold the rope 20 in position between driven pulley 34 and idler pulley 36. The driven pulley 34 is attached to shaft 38 which is supported and journalled by bearing 40 in bearing mount 42. Shaft 38 is powered through a pulley and belt drive mechanism including pulley 44 and belt 46 which connect to a drive motor contained in lower compartment 16 and shown schematically at 48 in FIG. 5. The rope 30 is held in an indentation formed in the outer surface of pulley 30 by idler pulley 36 which contains a knurled surface on the outer periphery thereof. Pulley 36 is rotatably mounted to handle 50 which is pivotally connected to mounting structure 42 at 52. The opposite end of handle 50 contains a hand grip 54 for displacing the pulley 36 upwardly against the downward bias of spring 56 which ordinarily holds the pulley in engagement against rope 20. Rope feeding is accomplished through setting timer rope length counter mechanism 58 contained on the control panel 59 and shown schematically in FIG. 5. Counter mechanism 58 times the engagement of drive clutch 60 connected to drive motor 48 to cause rotation of pulley 34 for feeding a length of rope as determined by the setting of the counter mechanism.

The rope is fed through die block 61 which is a rectangular metal block having an opening machined through the center for receiving the rope 20. The block 60 is mounted on stand 62 with the opening 64 in alignment with guides 30 and 32. A second opening is formed in the die block from the front thereof and communicates with opening 64. This opening receives heated air from heat supply tube 66 for melting the portion of the rope disposed within the die block thereby fusing that portion. Heated air is forced through supply tube 66 from heat chamber 68 disposed in the rear of the upper compartment 14. Heat chamber 68 contains a resistance heater, shown schematically at 70 in FIG. 5, which is fed current through cord 72 from the power supply disposed in compartment 16. An air pump shown schematically at 74 in FIG. 5 is disposed in lower compartment 16 and forces cool air through tube 76 into the heat chamber 68. The hot air is then transmitted through tube 66 to the die block when valves 78 and 80 are in the position shown in FIG. 3. As shown, valve 80 is open allowing the hot air to pass. Valve 78 is closed to inhibit any hot air from passing through exhaust pipe 82. A solenoid 84 has an armature 86 connected to a linkage including arms 88 and 89 which are attached to the shafts of valves 78 and 80 respectively to operate those valves. Thus, actuation of solenoid 84 causes both valves to change position eliminating the flow of heated air to the die block and forcing that air to flow from the exhaust pipe 82. The hot air flow through supply tube 66 is shut off in this manner when the access door 18 is opened to allow new rope to be threaded through the machine.

A third opening 90 is formed in top of the die block and communicates with opening 64. Opening 90 receives knife blade 92 which is mounted on rocker arm 94. The rear end of rocker arm 94 is spring biased downwardly by spring 96. The rocker arm is pivoted at 98 and thus the forward end, containing knife blade 92, is held up. An articulated connector linkage 100 is attached between the forward end of rocker arm 94 and the armature of solenoid 102 which is mounted in lower compartment 16. Accordingly, when solenoid 102 is actuated, the forward end of the rocker arm is pulled downwardly forcing the knife to slide through opening 90 thereby severing the rope contained within the die block.

Now with particular reference to FIG. 5, it can be seen that the control system of the invention includes a supply cord 104 connecting 220 volt AC current to the system through a main power switch 106. When power switch 106 is on, current is supplied to a pair of cooling fans 108 and 110 as well as drive motor 48 through line 112. Line 114 supplies current from switch 106 through fuse 116 to time delay relays 118 and 120. Also, a lamp 107 is illuminated to indicate that power is being supplied to the system when switch 106 is closed.

A second switch labelled 132 supplies current to resistance heater 70. The power supplied to the resistance heater can be controlled by variable resister 134 which is connected in series with the heater. A lamp 136 is illuminated when switch 132 is closed. Ordinarily, switches 106 and 132 would be closed simultaneously. For this reason, relay 118 causes illumination immediately of lamp 122. After the time delay set by relay 118, lamp 122 is extinguished thus indicating that appropriate time for proper heating of the resistance heater has elapsed. A third switch, switch 128 supplies current through line 126 to the air pump 74 and through line 138 to the main portion of the control circuit. It is noted that current is also supplied to air pump 74 through relay 120. Accordingly, when the power switch 106 is open, current is still supplied to the air pump 74 through fuse 130 and line 140 for a predetermined time set by the relay in order to insure that the resistance heater 70 is properly cooled down.

Line 138 connects to the movable contact of door switch 142 which is attached to access door 18 and moved from the normally closed position shown in FIG. 5 to the normally open position when the door is closed. Accordingly, with the door in the open position, current is shunted to air valve solenoid 84 which causes actuation of valves 78 and 80 exhausting the hot air generated in the heat chamber 68 through exhaust 82. When the door is closed, current is passed through the normally open contacts in line 144 to counter 146, the contacts of drive clutch relay 148, the contacts of cutter relay 150, the normally closed contact of cutter switch 152 and the contacts of time delay relay 154. The coil of relay 148 is connected to the counter 146. The coil of relay 150 is attached to the contacts of time delay relay 154. A piece counter 156 is also connected to the contacts of relay 154. The coil of relay 154 is operated through one of the normally open contacts of relay 158 which is operated from the cutter switch 152. Closure of switch 128 also causes the illumination of lamp 160 to indicate the machine is in operation.

In operation, switches 106 and 132 are closed thus supplying current to fan 108, 110, drive motor 48, pump 74 to relay 120 and heater 70. Relay 118, times the period necessary for heater 70 to come up to operating temperature. After the predetermined time has elapsed, the contacts of relay 118 open thus extinguishing lamp 122 indicating that switch 128 can be closed to produce operation of the machine. When switch 128 is closed, current is supplied directly through line 126 to the air pump 74 and to door switch 142. When access door 12 is closed, the door switch normally open contacts are closed supplying power to the remainder of the circuit. When the access door is open, current is passed through the normally closed contacts of the switch to air valve 84 causing the hot air produced in heater 72 and exits through exhaust 82.

Assuming the access door 18 to be closed, power is supplied to counter 146 and through terminal 3 of that counter to the drive clutch relay 148 which initiates operation of drive clutch 60 through transformer 162 and the rectifier bridge 164, pulse generator 166 is operated in any convenient manner by rototion of pulley 34 and thus emits pulses proportional to the length of rope fed by the pulley 34. Counter 146 is settable to the desired length of rope and when pulses received therein from pulse generator 166 equal the preset count, power is transferred from terminal 3 to terminal 4 of the counter thus terminating operation of drive clutch 60. Terminal 4 supplies power to the common terminal of relay 158. Relay 158 is energized through switch 152. Thus, current is immediately passed to time delay relay 154 which provides a sufficient time delay to insure that the portion of rope 20 disposed in die block 60 is properly fused. After relay 154 times out, the contacts thereof close supplying current to relay 150 and through the contacts of relay 150 to cutter solenoid 102 which operates knife 92 severing the rope within the die block. At the same time, current is supplied to piece counter 156 advancing that counter by a single increment. Movement of the knife 92 through its full stroke causes opening of the normally closed contacts of cutter switch 152. This removes energization from relay 158 thus opening both sets of contacts thereby resetting time delay relay 154 and resetting counter 146. This cyclic operation continues until switch 128 is opened. After all the switches 106, 132 and 128 have been opened, time delay relay 120 continues to supply power to the air pump 74 in order to cool the heater 70 to insure longevity of that element.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A rope cutting and sealing machine for severing predetermined lengths of rope from a supply of rope and fusing the severed ends, said machine comprising:
   a housing;
   a control panel disposed in an accessible position on said housing;
   a die block having an opening disposed therein for receiving said rope to be cut;
   rope feed means for feeding a predetermined length of rope through said die block;
   heater means for heating air to be applied to said rope to be cut;
   blower means connected to said die block for blowing air heated by said heater means onto a portion of the rope disposed in said die block thereby fusing that portion of rope;
   cutter means connected to said die block for severing the rope disposed therein; and
   control means for controlling automatic cyclic operation of said machine.

2. The invention as defined in claim 1 wherein said rope feed means includes a first pulley having an outer periphery adapted to receive the rope to be fed; a second pulley; biasing means attached to said second pulley for biasing said second pulley toward said first pulley for holding the rope to be fed between said pulleys; and motor power means drivingly connected to said first pulley for producing powered rotation thereof.

3. The invention as defined in claim 2 wherein said control means includes a pulse generator operatively connected to said motive power means for producing pulses in response to rotation of said first pulley and a counter means for counting said pulses and causing termination of powered operation of said first pulley in response to receipt of a predetermined number of pulses.

4. The invention as defined in claim 1 wherein said heater means includes a first conduit for channeling heated air to said die block and a second conduit for exhausting heated air; valve means for individually closing off one or the other of said first and second conduits.

5. The invention as defined in claim 4 wherein said housing includes an access door for allowing access to the interior of said housing, and further wherein said control means includes a sensor for sensing the opening of said access door and operating said valve means for causing the exhaust of heated air through said second conduit.

6. The invention as defined in claim 1 wherein said cutter means includes a vertically displaceable knife disposed in a vertical slot in said die block, said control means including cutter control means for causing powered downward movement of said blade and sensor means for sensing the completion of the downward stroke of said blade for removing power from said cutter control means.

7. The invention as defined in claim 1 wherein said control means includes timer means for delaying actuation of said cutter means for a predetermined time during application of said heated air from said heater means to said die block.

8. An apparatus for performing cutting and fusing operations on the ends of elongated material made from a fusible substance, comprising:
   material feed means for feeding a predetermined longitudinal portion of material to be cut;
   material heating means including a first conduit for channeling heated air for heating a transverse portion of said material for a predetermined time prior to being cut and further including a second conduit for exhausting heated air; and
   cutter means for severing the transverse portion of said material through the center of said heated portion after said predetermined period has elapsed.

9. An apparatus for performing cutting and fusing operations on the ends of elongated material made from a fusible substance, comprising;
   material feed means for feeding a predetermined portion of material to be cut;
   material heating means for heating a portion of said material for a predetermined time prior to being cut;
   cutter means for severing the material through the center of said heated portion after said predetermined period has elapsed;
   control means for controlling sequential operation of said material feed means, said heater means and said cutter means, said control means comprising a counter means connected to said material feed means for counting the length of material fed thereby, and
   time delay means operatively connected to said counter means for causing said heater means to apply heat to said material for a predetermined length of time after a predetermined length of material has been fed, and commanding initiation of operation of said cutter means after said predetermined length of time has elapsed.

10. The invention as defined in claim 9 and further including sensor means operatively connected to said cutter means for sensing the cutting of material and for resetting said time delay means and said counter means.

11. The invention as defined in claim 10 and further wherein said heater means includes a resistance heater and a blower for forcing air past said resistance heater, and further wherein said control means includes a main power switch and a blower delay relay for maintaining operation of said blower means for a predetermined time after said main power switch is turned off.

12. The invention as defined in claim 11 and further including a piece counter operatively connected to said time delay, said piece counter being incremented by one count upon each actuation of said cutter means.

13. The invention as defined in claim 8 and including sensor means operatively connected to said cutter means for sensing the cutting of material and means for adjustably setting and resetting said predetermined time of said material heating means.

14. The invention as defined in claim 8 and including control means for controlling sequential operation of said material feed means, said heater means and said cutter means.

15. The invention as defined in claim 8 and including a piece counter operatively connected to said material heating means and being incremented by one count upon each actuation of said cutter means.

16. The invention as defined in claim 8 and further including control means for controlling sequential operation of said material feed means, said heater means and said cutter means, said control means comprising a counter means connected to said material feed means for counting the length of material fed thereby, time delay means operatively connected to said counter means for causing said heater means to apply heat to said material for a predetermined length of time after a predetermined length of material has been fed, and commanding initiation of operation of said cutter means after said predetermined length of time has elapsed.

17. The invention as defined in claim 16 and further including sensor means operatively connected to said cutter means for sensing the cutting of material and for resetting said time delay means and said counter means.

18. The invention as defined in claim 17 and further wherein said heater means includes a resistance heater and a blower for forcing air past said resistance heater, and further wherein said control means includes a main power switch and a blower delay relay for maintaining operation of said blower means for a predetermined time after said main power switch is turned off.

19. The invention as defined in claim 18 and further including a piece counter operatively connected to said time delay, said piece counter being incremented by one count upon each actuation of said cutter means.

* * * * *